United States Patent Office 3,244,580
Patented Apr. 5, 1966

3,244,580
GLASS FIBER BINDER COMPOSITION
CONTAINING TALL OIL PITCH
Joseph P. Stalego, Newark, Ohio, assignor to Owens-Corning Fiberglas Corporation, a corporation of Delaware
No Drawing. Filed Aug. 21, 1959, Ser. No. 835,291
8 Claims. (Cl. 161—170)

This invention relates to a binder composition, and, more particularly, to such a composition that is especially adapted for use in connection with glass or other vitreous fibers.

The production of wool-like and board-like masses of intermeshed glass and other vitreous fibers is an important industry. Wool-like masses of such fibers are produced by drawing streams of molten glass from a suitable body thereof through small diameter orifices, attenuating the streams to provide a desired fiber diameter or average fiber diameter, projecting the resulting fibers and a suitable binder composition onto a foraminous conveyor, and advancing the collected fibers through a suitable curing oven to cause hardening of the binder composition. Board-like masses of such fibers are produced in a similar manner, except that the final curing is carried out while the mass of fibers is compressed in a desired shape, so that the binder cures or hardens in the environment of a densified mass of the fibers, and locks them in such densified condition.

Phenolic resins, usually of the phenolformaldehyde type, have been found to be admirably suited in binder compositions for use with glass and other vitreous fibers, particularly when used in conjunction with a pinewood pitch extract to improve the flow characteristics [1] of the phenolic resin. It has been found, however, that a pinewood pitch extract tends to increase the rate of cure of a binder composition in which it is used. While this may be advantageous to a limited extent, because the desired final cure of the binder composition is accelerated, it is not possible to use an excessively rapid curing binder composition with glass fibers because such a composition will cure so fast when it is associated with fibers and heated that it will not flow to fiber-to-fiber junctures where it is required to be effective as a binder. In addition, a binder which cures at an excessively rapid rate tends to collect on the hot walls of a forming hood, where its presence constitutes a fire hazard and necessitates frequent cleaning. As a consequence of the characteristic of a pinewood pitch extract of increasing the rate of cure of a phenolic binder composition, the amount thereof which it has heretofore been possible to use to improve the flow characteristics of the binder composition has been limited.

The present invention is based upon the discovery that various tall oil pitches can be used as constituents of phenolic binder compositions for use with glass or other vitreous fibers, and that such pitches have the desirable characteristic of retarding the rate of cure of the composition without disadvantageously affecting the flow characteristics thereof. Such pitches can be used with or without pinewood pitch extracts, but are preferably employed in conjunction with the extracts to obtain compositions combining an optimum of flow characteristics and cure rate.

It is, therefore, an object of the invention to provide an improved phenolic resin binder composition.

It is a further object of the invention to provide an improved phenolic resin binder composition comprising a tall oil pitch.

It is a further object of the invention to provide a method for producing a mass of intermeshed glass or other vitreous fibers bonded together at points of contact by an improved phenolic binder composition in a cured or hardened condition.

Other objects and advantages will be apparent from the description which follows, which is intended only to illustrate and disclose, and in no way to limit, the invention.

According to the invention an improved heat hardenable phenolic resin binder composition is provided. Such a composition has a solids content from about 3 percent [2] to about 24 percent, and is an aqueous dispersion consisting essentially of a heat hardenable phenolic resin, and a cure controlling composition comprising, per 100 parts of the phenolic resin, from 5 parts to 100 parts of a tall oil pitch [3] and not more than 100 parts of a pinewood pitch extract. The heat hardenable phenolic resin is one selected from the group consisting of phenolformaldehyde condensation products and phenol-amino compound-formaldehyde condensation products, and is of the resole type. The tall oil pitch is one having a flash point from 400° F. to 550° F.

The invention will be more fully understood by reference to the following examples, which are presented solely for the purpose of illustrating and disclosing, and

---

[1] A binder is usually associated with glass or other vitreous fibers in a forming hood, being projected with the fibers through a compressible fluid, usually air, onto a foraminous conveyor. The binder is heated by hot fibers, or by hot fluid or by both. Studies of the phenomena involved within the forming hood and on the conveyor indicate that a binder composition sprayed into the forming hood is applied to the fibers principally by filtration from the compressible fluid onto a wool-like mass of the fibers collecting on the conveyor. After the binder composition is deposited on the fibers, it must flow to fiber-to-fiber junctures in order to be effective as a binder, when cure is completed. The flow characteristics of a binder composition can be evaluated by means of a test which is subsequently described in more detail, and which involves depositing a predetermined quantity thereof on a hot plate and measuring the dimensions of the deposited composition after cure proceeds to such an extent that no further flow occurs.

[2] The terms "percent" and "parts" are used herein, and in the appended claims, to refer to percent and parts by weight, unless otherwise indicated.

[3] Tall oil is a by-product of the paper making industry; tall oil pitch is a commercially available residue left after distillation of crude tall oil to recover rosin acids and tall oil fatty acids. Tall oil pitches have the following properties:

| | |
|---|---|
| Acid number | 40–160 |
| Percent rosin acids | 0.5–20 |
| Percent fatty acids | 7–80 |
| Saponification number | 115–165 |
| Percent unsaponifiables | 20–35 |
| Flash point, ° F. | 325–600 |

In general, a pitch can be identified by its flash point, which varies as a direct function of percent rosin acids and as an inverse function of percent fatty acids.

are in no way to be construed as limitations upon, the invention.

EXAMPLE 1

A binder composition was prepared in a mixing tank provided with a propeller-type agitator, which tank was first charged with 800 parts of water, and the water and subsequently charged ingredients were stirred during the formulation of the binder composition. An 83 part portion of a Phenolic Resin A [4] was then added, followed by 171 parts of a tall oil pitch-pinewood pitch extract composition B [5], 7½ parts of 28 percent ammonium hydroxide, 22 parts of mineral oil emulsified with stearic acid and ammonium carbonate, 0.7 part of ammonium sulfate, and 0.03 part of gamma-aminopropyl-triethoxy-silane. Agitation was continued for five minutes after the silane addition to assure substantial uniformity of the completed binder composition.

The binder composition produced as described in the preceding paragraph was sprayed into a forming hood through which glass fibers were being projected onto a foraminous conveyor. The fibers were collected in the form of a wool-like mass associated with the binder composition. The relative proportions of binder composition and fibers were such that the binder, after cure thereof, constituted slightly in excess of 8 percent of the total wool-like mass. Cure was accomplished in an oven maintained at a temperature of about 400° F. through which the glass fibers and associated binder were passed in a period of about one [6] minute. Examination of the wool-like product which was produced, after cure of the binder composition, indicated that the composition had flowed satisfactorily to areas of fiber-to-fiber contact, so that the tall oil pitch-pinewood pitch extract composition B had neither unduly accelerated the cure of Phenolic Resin A nor disadvantageously affected the flow characteristics thereof.

The effect of the tall oil pitch-pinewood pitch extract composition B upon flow characteristics of Phenolic Resin A and upon gel time of Phenolic Resin A were also determined by an independent series of tests. For these tests, a special tall oil pitch-pinewood pitch extract composition B (30 percent) [7] was prepared. Several compositions were then prepared as set forth in the following table:

TABLE I

|  | Composition 1 | Composition 2 | Composition 3* | Composition 4* |
|---|---|---|---|---|
| Parts of Phenolic Resin A | 140 | 140 | 140 | 84 |
| Parts of Tall Oil Pitch-Pinewood Extract Composition B (30%) | 140 | | | |
| Parts of Tall Oil Pitch | | 42 | | |
| Parts of Pinewood Pitch Extract | | | 42 | |
| Parts of Water | 6 | 104 | 104 | 16 |

*Not in accordance with the invention; presented for purposes of comparison.

Flow characteristics of compositions 1 through 4 were then checked by charging a burette with a 5 cc. portion of each, discharging each 5 cc. portion onto the center of a hot plate maintained at a temperature of 150° C., and, after the composition had cured to a hardened condition, measuring the diameter of the cured resin film in two directions at right angles to one another. Gel time of each of the compositions was determined by charging a burette with a 2 cc. portion of each, flowing the charge onto a hot plate maintained at 150° C., and determining the time required for each composition to cure, on the hot plate, to a condition at which strings formed from the sample when patted with a spatula. The results of these tests are presented in Table II, below:

TABLE II

|  | Flow characteristics diameter of cured film in inches | | Gel time in seconds |
|---|---|---|---|
|  | First direction | Second direction |  |
| Composition 1 | 3¾ | 3¾ | 185 |
| Composition 2 | 3¾ | 3¾ | *300+ |
| Composition 3 | 3¾ | 4 | 116 |
| Composition 4 | 3 | 3½ | 122 |

*This composition was not fully gelled after 300 seconds.

Phenolic Resin A was prepared from 180 parts of formalin, or 37 percent water solution of formaldehyde, 100 parts of phenol and 4 parts of sodium hydroxide. The starting materials were mixed in a suitable vessel, allowed to stand at room temperature (about 25° C.) for approximately 16 hours, and heated at a progressively increasing temperature which was sufficient to maintain gentle boiling thereof. Heating was discontinued when the temperature of the reaction mixture reached approximately 85° C. The sodium hydroxide in the reaction mixture was then neutralized with phosphoric acid, and the neutralized resin was filtered.

It has also been determined that as little as 5 percent of tall oil pitch, based upon total solids of Phenolic Resin A, is effective to increase the gel time thereof, and without appreciable effect upon the flow characteristics thereof. On the indicated basis, 10 percent, 21 percent and 26.5 percent of the tall oil pitch have been added to Phenolic Resin A, and gel time has been found to be a direct function of the percent of tall oil pitch used, while flow characteristics have been found to remain substantially unchanged.

EXAMPLE 2

Various binder compositions other than those described in Example 1, above, have been produced in the manner set forth and have been used as described in Example 1 in producing wool-like and board-like bodies of intermeshed glass fibers. Data concerning representative ones

---

[4] Phenolic resin A was an aqueous dispersion of phenol-formaldehyde condensation products, solids content 41.5 percent. The production thereof is subsequently described in detail.

[5] The composition was an aqueous dispersion containing, per 100 parts thereof, 20¾ parts of tall oil pitch having a flash point of substantially 530° F. and 20¾ parts of pinewood pitch extract. The pinewood pitch extract that was used is resinous in nature and can be isolated as described in U.S. Patent 2,391,368 (page 2, column 1, line 34 and following). It had the following analysis:

6 percent high melting furfural condensate (methanol insoluble).
4 percent neutral oils (hydrocarbons esters and ethers).
9 percent rosin.
5 percent belro-phenol-lactone (probably
$C_{18}H_{14}O_3 \cdot 2(OCH_3OH)$)
5 percent flavone type polyphenol (possibly about $C_{15}H_7O_2 \cdot 30H$).
2 percent fumic acid type compound.
0.2 percent pectic acid type compound.
6 percent air oxidized resin acid (unfused).
3 percent strongly acidic compound.
38 percent weakly acid, high melting phenolic compound.
19 percent relatively neutral phenol ethers and esters.
1 percent water soluble carbohydrates etc.

[6] Depending upon the product desired, the optimum cure temperature may deviate somewhat from 400° F., and oven time may vary from about one minute to about five minutes.

[7] This composition was identical with the previously described composition B, except that it had a 30 percent solids content instead of a 25 percent solids content.

of such binder compositions is set forth in Table III, below:

TABLE III

| Composition in parts | Binder composition No. | | | | |
|---|---|---|---|---|---|
| | 2 | 3 | 4 | 5 | 6 |
| Water | 1,067 | 687 | 761 | 369 | 431 |
| Phenolic Resin A | 146 | 371 | 368 | 197 | |
| Phenolic Resin B* | | | 246 | | 198 |
| Tall oil pitch-pinewood pitch extract Composition B | 43 | 458 | 281 | 140 | 70 |
| Ammonium hydroxide (28 percent) | 4½ | 15 | 2¼ | | 6 |
| Mineral oil emulsified with stearic acid and ammonium carbonate | 30 | 40 | 25 | 10 | 10 |
| Ammonium sulfate | | 1.4 | 1.5 | 0.1 | ½ |
| Gamma-aminopropyltriethoxy-silane | 0.1 | ¼ | ⅓ | ½ | 0.1 |
| Red dye | 0.5 | | | | 0.1 |

*Phenolic resin B was produced by charging a reaction vessel with 58 parts of phenol, 123.4 parts of formalin, and 12 parts of barium hydrate (Ba(OH)₂.8H₂O), and heating the resulting charge for a total of 10 hours during which time it was stirred by a propeller-type agitator. The charge was first heated to 110° F., and maintained at about such temperature for approximately 3 hours, heated to and held at approximately 120° F. for an additional 5 hours, and then heated to and held at about 140° F. for the remaining 2 hours. The reaction products were then cooled to approximately 100° F., and neutralized with sulfuric acid to a pH of about 7.5. A 23.2 part charge of melamine was then added to the neutralized reaction products, and the resulting mixture was heated to and maintained at approximately 140° F. for an additional 2 hour period. The reaction products were then cooled to approximately room temperature of 75° F., and neutralized with further sulfuric acid to a pH of approximately 7.2.

Excellent results have also been achieved using, instead of Phenolic Resins A and B, identified above, phenolic compositions produced similarly to Resin B, but using various proportions of urea instead of all or a part of the melamine in producing phenol-amino compound-aldehyde products. Dicyandiamide urea borate and guanidine can be substituted for all or part of the urea, and substituted melamines can be used in place of at least a part of the melamine with excellent results.

The phenolic resin, water and the cure-controlling composition (tall oil pitch or tall oil pitch plus pinewood pitch extract) are the essential constituents of the above-identified binder compositions. Binder compositions including these essential constituents have been found to be unexpectedly stable and non-abrasive, as well as free from settling, by comparison with previously known compositions. The ammonium hydroxide, emulsified mineral oil, ammonium sulfate, silane and dye are used in some instances to control a particular property or properties of a finished product, but do not appreciably affect the advantageous and unexpected characteristic of the tall oil pitch in the binder.

It is usually preferred that the cure controlling composition comprise, per 100 parts of the resin, from 10 to 75 parts of tall oil pitch and from 10 to 75 parts of pinewood pitch extract. Most desirably, the cure retarding composition comprises from 20 to 50 parts of tall oil pitch and from 20 to 50 parts of pinewood pitch extract.

It will be apparent that various changes and modifications can be made from the specific details set forth herein without departing from the spirit and scope of the invention as defined in the appended claims.

What I claim is:

1. A heat hardenable phenolic resin binder composition having a solids content from about 3 percent to about 24 percent, and that is an aqueous liquid blend of a phenol-formaldehyde resole, and a cure controlling composition comprising, per 100 parts of the phenolic resin, from 5 parts to 100 parts of a tall oil pitch having a flash point from 400° F. to 550° F.

2. A heat hardenable phenolic resin binder composition having a solids content from about 3 percent to about 24 percent, and that is an aqueous liquid blend of a phenol-amino compound-formaldehyde resole, and a cure controlling composition comprising, per 100 parts of the phenolic resole from 5 parts to 100 parts of a tall oil pitch having a flash point from 400° F. to 550° F. and up to 100 parts of a pinewood pitch extract.

3. A heat hardenable phenolic resin binder composition having a solids content from about 3 percent to about 24 percent, and that is an aqueous liquid blend of a phenolic resole, and a cure controlling composition comprising per 100 parts of the phenolic resole, from 10 parts to 75 parts of a tall oil pitch having a flash point from 400° F. to 550° F. and from 10 parts to 75 parts of a pinewood pitch extract.

4. A heat hardenable phenolic resin binder composition having a solids content from about 3 percent to about 24 percent, and that is an aqueous liquid blend of a phenolic resole, and a cure controlling composition comprising, per 100 parts of the phenolic resole, from 5 parts to 100 parts of a tall oil pitch having a flash point from 400° F. to 550° F. and up to 100 parts of a pinewood pitch extract.

5. A heat hardenable phenolic resin binder composition having a solids content from about 3 percent to about 24 percent, and that is an aqueous liquid blend of a phenolic resole, and a cure controlling composition comprising, per 100 parts of the phenolic resole, from 20 parts to 50 parts of a tall oil pitch having a flash point from 400° F. to 550° F. and from 20 parts to 50 parts of a pinewood pitch extract.

6. A method for producing a mass of intermeshed vitreous fibers which includes the steps of depositing the fibers on a foraminous conveyor in a wool-like mass, depositing on the wool-like mass of fibers a hardenable phenolic resin binder composition having a solids content form about 3 percent to about 24 perecent, and which is an aqueous liquid blend of a phenolic resole, and a cure controlling composition comprising, per 100 parts of the phenolic resole, from 5 parts to 100 parts of a tall oil pitch having a flash point from 400° F. to 550° F. and up to 100 parts of a pinewood pitch extract, and heating the mass of fibers and associated binder composition to convert the latter to a hardened, cured condition.

7. A glass fiber coated with a thermoset phenolic resin binder composition which is the product of heat curing a blend of a phenolic resole, and, per 100 parts of the phenolic resole, from 5 parts to 100 parts of a tall oil pitch having a flash point from 400° F. to 550° F. and up to 100 parts of a pinewood pitch extract.

8. A mass of intermeshed glass fibers bonded to one another at points of contact by a thermoset phenolic resin binder composition which is the product of heat curing a blend of a phenolic resole, and, per 100 parts of the phenolic resole, from 5 parts to 100 parts of a tall oil pitch having a flash point from 400° F. to 550° F. and up to 100 parts of a pinewood pitch extract.

References Cited by the Examiner
UNITED STATES PATENTS

| 2,391,368 | 12/1945 | Underwood | 260—25 |
|---|---|---|---|
| 2,424,074 | 7/1947 | Bent et al. | 260—97.5 |
| 2,604,427 | 7/1952 | Armstrong et al. | |
| 2,620,319 | 12/1952 | Rowe | 260—19 |
| 2,678,961 | 5/1954 | Uhlig et al. | 260—25 |
| 2,707,690 | 5/1955 | Pearson | 154—101 |
| 2,801,198 | 7/1957 | Morris et al. | 154—43 |
| 3,048,508 | 8/1962 | Boiney et al. | 154—43 |
| 3,056,708 | 10/1962 | Ball | 156—335 |

EARL M. BERGERT, *Primary Examiner.*

CARL F. KRAFFT, *Examiner.*